H. P. KRAFT.
SPREADER.
APPLICATION FILED MAR. 19, 1917.

1,245,110.

Patented Oct. 30, 1917.

WITNESSES:

INVENTOR
Henry P. Kraft
By Attorneys,

UNITED STATES PATENT OFFICE.

HENRY P. KRAFT, OF RIDGEWOOD, NEW JERSEY.

SPREADER.

1,245,110.     Specification of Letters Patent.     Patented Oct. 30, 1917.

Application filed March 19, 1917. Serial No. 155,819.

*To all whom it may concern:*

Be it known that I, HENRY P. KRAFT, a citizen of the United States of America, residing in Ridgewood, in the county of Bergen and State of New Jersey, have invented certain new and useful Improvements in Spreaders, of which the following is a specification.

This invention relates to spreaders for pneumatic tires, and aims to provide certain improvements therein.

Such spreaders are used at the inner ends of pneumatic tire valves, and are adapted to engage the inner sides of the pneumatic casing or shoe to prevent creeping, and to assist in holding the casing in place on the rim. In certain tires of small diameters the inner edges of the shoe approach each other closely, and the spreader hence must be made narrow, with the result that the space between the upturned flanges of the spreader is not sufficient to accommodate the foot or inner flange of the tire valve. The latter cannot be successfully reduced since this would imperil its connection with the inner tube. According to the present invention I provide a construction in which the spreader is peculiarly shaped so as to provide a firm bearing for the foot of the valve, while retaining its external dimensions. The invention also includes certain other features of construction which will be hereinafter more fully described.

In the accompanying drawings, which illustrate the present invention,—

Figure 1:
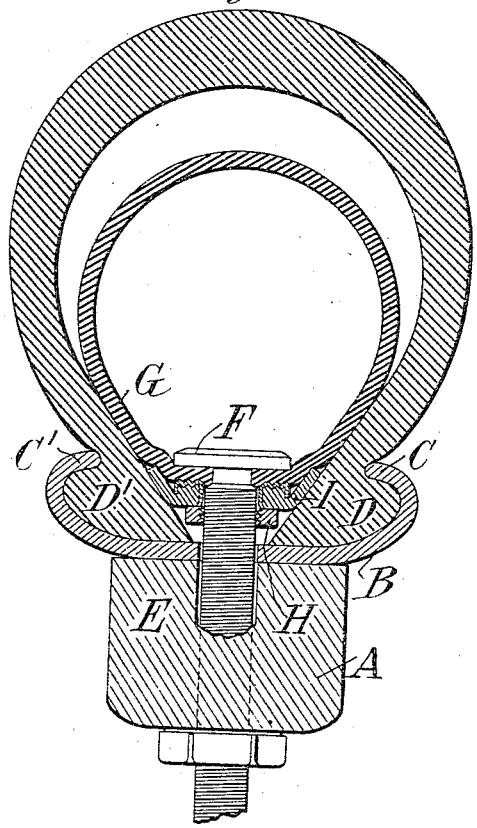
Figure 1 is a cross-sectional view of a tire, showing the spreader and valve in place.
Figure 2:
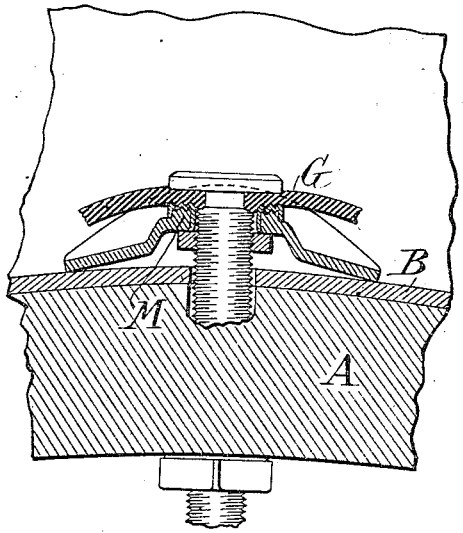
Fig. 2 is a longitudinal or circumferential section.
Figure 3:
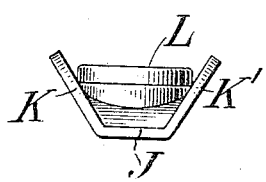
Fig. 3 is an end view of the spreader detached.
Figure 4:
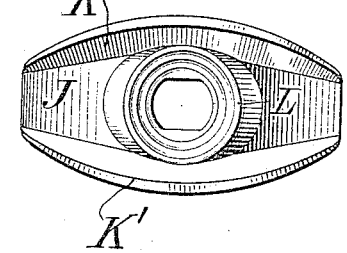
Fig. 4 is a top or plan view of the latter.

Referring to the drawings, let A indicate a wheel felly having a rim B provided with flanges C C' which are adapted to engage the beads D D' of the tire shoe. E indicates the ordinary tire valve having an inner foot or flange F which is clamped to the inner tube G of the pneumatic tire by means of a nut H, the spreader I being interposed between the nut and the flange F. The spreader usually comprises a bottom portion J and side flanges K K', as best seen in Figs. 3 and 4.

When the tire shoe is of small diameter, a narrow spreader must be used, and in this type of spreader the side flanges K K' approach each other so closely at the bottom that there is not room between them for the flange F of the tire valve. Consequently it has been the custom to interpose a washer between the flange F and the bottom of the spreader.

According to the present invention I provide a spreader having a central portion which is raised above the bottom portion J to such an extent that the valve flange F can rest securely upon it without rocking. This enables me to avoid the use of a separate washer between the spreader and the valve, thus cheapening the cost of construction. Ordinarily a lining of brass, such as M, is used for the purpose of providing a brass part for contacting with the underside of the inner tube, it being found that a better joint is made with such tube if a metal, such as brass, is used. The spreader is usually constructed of sheet steel, and according to my invention the raised portion L is stamped up from its center to an appropriate height, so that it lies well above the bottom J of the spreader.

While I have shown and described one form of the invention, it will be understood that it is not to be limited thereto, since various modifications may be made therein without departing from the spirit of the invention.

What I claim is:—

1. A spreader having a bottom wall and side flanges, the side flanges converging toward the bottom wall, and the bottom wall being of less width than the diameter of a valve foot or flange, and such bottom wall having a portion raised above the level thereof to an extent sufficient to form a bearing for such foot or flange.

2. A spreader formed of stamped sheet metal, having a bottom wall and side flanges, the side flanges converging toward the bottom wall and the bottom wall being of less width than the diameter of a valve foot or flange, and such bottom wall having a portion stamped up above the level thereof to an extent sufficient to form a bearing for such foot or flange.

In witness whereof, I have hereunto signed my name.

HENRY P. KRAFT.